United States Patent [19]
DeBrick

[11] 4,213,399
[45] Jul. 22, 1980

[54] RESILIENT UNIVERSAL LOCOMOTIVE SUSPENSION

[75] Inventor: Eric DeBrick, Bluefield, W. Va.

[73] Assignee: New River Manufacturing Company, Inc., Glen Lyn, Va.

[21] Appl. No.: 949,658

[22] Filed: Oct. 10, 1978

[51] Int. Cl.$^2$ .......................... B61F 3/00; B61F 5/16; B61F 5/30; B61F 5/50
[52] U.S. Cl. .............................. 105/157 R; 105/136; 105/218 R; 105/224 R
[58] Field of Search ................. 64/21; 105/79, 80, 81, 105/133, 136, 157 R, 182 R, 218 R, 224 R; 280/109, 110, 111, 112 R, 112 A

[56] References Cited
U.S. PATENT DOCUMENTS

| | | | |
|---|---|---|---|
| 2,020,756 | 11/1935 | Woodard | 105/80 |
| 2,890,063 | 6/1959 | Stover | 280/112 R X |
| 3,334,912 | 8/1967 | Mauck | 280/111 X |
| 3,807,752 | 4/1974 | Mauck | 280/124 R |
| 4,085,682 | 4/1978 | Nelson et al. | 105/157 R |

*Primary Examiner*—Howard Beltran
*Attorney, Agent, or Firm*—McCaleb, Lucas & Brugman

[57] ABSTRACT

Universally mounted wheelset where an axle housing suspension utilizes a rocking hinge principle to absorb shocks with limited up and down movement. A pair of swivel blocks are connected by trunnions to fore and aft ends of the axle assembly enabling rocking movement of the axle assembly about a longitudinal axis extending generally longitudinally of the direction of movement of the vehicle. One of the swivel blocks is hinged to the vehicle frame. This enables the axle housing to tilt up and down about the hinged swivel block in addition to rocking about the longitudinal axis. Cushioning springs are provided between the vehicle frame and the opposite, tiltable end of the axle assembly. The swivel block at the tiltable end has a pair of transverse horizontal rollers at opposite sides engaged within vertical guide slots formed in mounting blocks fixed to the frame; and it is telescopically supported on the axle housing for limited fore and aft movement to compensate for arcuate movement of the axle assembly as the rollers are guided up and down within the guide slots.

1 Claim, 6 Drawing Figures

RESILIENT UNIVERSAL LOCOMOTIVE SUSPENSION

BACKGROUND OF THE INVENTION

The invention relates to suspensions for vehicles, for cushioning shocks on an axle assembly caused by irregularities in the track or ground before they can be transmitted to the vehicle frame. It was developed primarily for underground mine haulage locomotives used in low height mines where there is insufficient head room to accommodate the full vertical movement of the vehicle frame if conventional journal box wheel suspensions were used. It will be apparent as the description proceeds that the improved suspension may usefully be applied to other railway and non-railway type vehicles, to obtain maximum cushioning where only limited vertical movement of the frame is permissible because of low head room or for other reasons.

The problem of moving heavy loads over bad road beds under a low ceiling is perhaps unique to underground mines, and to coal mines in particular. Most mine track undulates up and down, and sidewise, because it is not economical to lay it with straight line, above ground precision on a deep, stable road bed. And, once installed, the track conditions often worsen due to irregular heaving of the mine bottom and constant back and forth movements of heavy mine cars and locomotives.

Attempts have been made to develop vehicles for use in thin seam coal mining, in which there is little or no relative vertical movement between the wheels and the body. For example, about 20 years ago, considerable work was done by mining machine manufacturers attempting to develop a shuttle car with wheels solidly connected to a flexible steel body. The body was supposed to flex as it moved across uneven bottom. Unfortunately, the body strength required to hold and transport several tons of coal was not compatible with the required flexibility so the bodies were constantly breaking up. After much money was spent, the flexible body idea was abandoned.

Similar attempts to mount the wheels rigidly on the bodies of mine haulage locomotives were unsuccessful. On rough track, some of the wheels would always be out of engagement with the rails, allowing the locomotive to derail easily.

More recently, light weight, self propelled personnel cars have been developed to transport men and supplies in underground mines. In one such car, for low height mines, each axle assembly was mounted between a pair of trunnions for rocking movement against springs, about a central, longitudinal axis. The trunnions were pivotally journaled in swivel blocks which were connected solidly to the frame, fore and aft of each axle assembly. Although there was no relative vertical movement between the frame and the axle assemblies, some cushioning was provided for personnel by rocking the axle assembly upward against the springs. This was quite successful in preventing derailment while limiting vertical movement of the frame and reducing to an appreciable extent the transfer of shocks from the wheels to the frame. However, on long trips, the ride was rough and uncomfortable.

The above mentioned personnel cars were subsequently improved by the development of a rocking hinge type suspension. This was similar to the suspension described in the above paragraph except that one of the trunnion swivel blocks was hinged on the frame while the axle assembly and the opposite swivel block swung upward against the springs. This construction is shown in U.S. Pat. No. 4,085,682 issued Apr. 25, 1978 to Robert C. Nelson et al. This represented a substantial improvement in the suspension for personnel cars. The axle assembly rocked about a longitudinal axis through the trunnions as previously. In addition, the axle assembly tilted up and down, with the springs absorbing shocks from both tilting and rocking movements. Rider comfort was improved, especially on long trips.

In the above described improved personnel cars, the vertically movable swivel block at the tiltable end of the axle assembly has been slideably guided for up and down movement between a pair of transversely spaced, vertical guide plates. While this particular construction is quite satisfactory for relatively light duty personnel carriers, it lacks the ruggedness and friction-free precision needed to apply the rocking hinge suspension principle to heavy duty mine haulage locomotives.

SUMMARY OF THE INVENTION

It is a general object of the present invention to provide a shock absorbing articulated jointed suspension to cushion shocks transmitted from a vehicle wheel to its frame, with limited up and down motion of the frame.

A particular object is to provide, for a heavy duty vehicle such as an underground mine locomotive, an improved rocking hinge type suspension in which the axle assembly is pivotally connected to the vehicle frame for rocking movement about a longitudinal axis generally parallel to the direction of movement of the vehicle and it is hinged for upward tilting movement against springs to cushion shocks by a compound motion resulting in rocking movement about that longitudinal axis and tilting movement about a hinge axis transverse to it.

Another object is to provide such a rocking hinge type suspension with an improved vertical guide arrangement for the tiltable end of the axle assembly including roller means supported on the axle assembly engaging vertical guide track means on the frame.

Another, more specific, object is to provide an improved rocking hinge type suspension with a swivel block pivotally and telescopically journaled on the trunnion at the tiltable end of the axle assembly, and a pair of rollers on opposite sides of the pivotal swivel block providing rolling, friction-free engagement with vertical slots formed in guide tracks fastened to the frame.

BRIEF DESCRIPTION OF THE DRAWINGS

Other objects and advantages will be apparent from the following description taken in connection with the accompanying drawings in which.

Like parts are referred to by like reference characters.

DESCRIPTION OF THE PREFERRED EMBODIMENT

Figure 1:
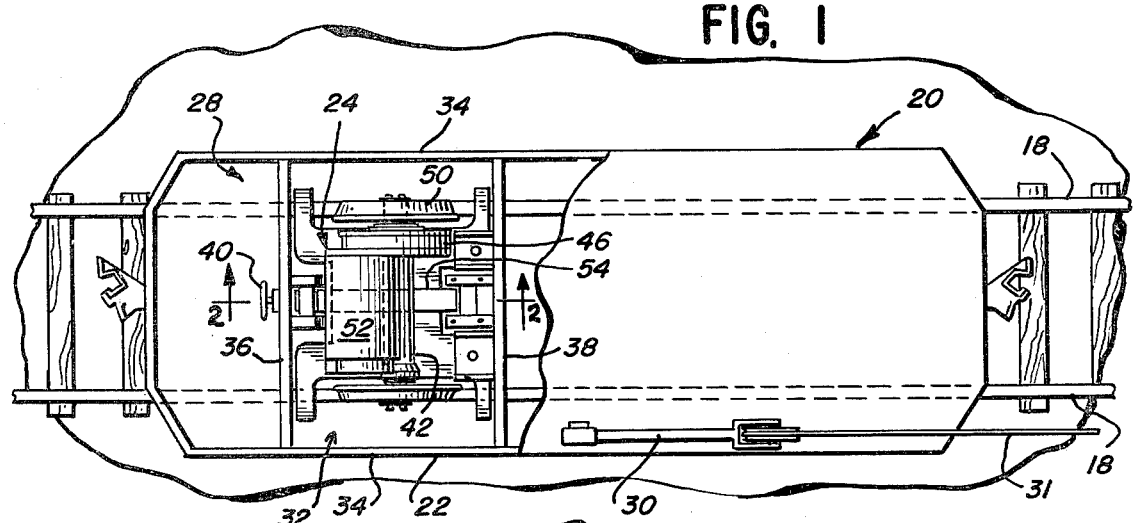
FIG. 1 is a top plan view of an underground mine haulage locomotive illustrating the present invention applied to one specific type of vehicle.

The vehicle chosen to illustrate the invention, generally designated 20, is an underground mine haulage locomotive. It runs on railway type tracks 18 to haul a trip of mine cars into and about an underground mine. One of the major current applications is in coal mines.

The vehicle has a frame or body 22 mounted on a pair of axle assemblies 24 by suspension means which is the subject of the present invention. The frame illustrated is conventional and will not be described in detail. It has an operator's compartment 28 and it may be electrically powered through a trolley 30 from an overhead trolley wire 31, or by batteries (not shown) or both a trolley and batteries in combination.

The axle assembly compartment 32 is here bounded by vertical side wall plates 34, 34 and fore and aft end plates 36 and 38.

The operator's compartment 28 is shown without any of the usual tramming, braking, and other controls because these comprise no part of the present invention. However, to readily identify it as the operator's compartment, the conventional brake control wheel 40 is shown.

Referring now to the axle assembly 24, this comprises a generally cylindrical cross-section axle housing 42 with a hub 44 at one side of the vehicle and a reduction gear box 46 at the other side. A wheel-set having an axle 48 extends through the axle housing and gear box and has flanged railway type wheels 50 mounted on it. Retainer plates 26 are provided at the end of the axle and gear box to support the usual bearing and seals. An electrical motor 52 is mounted on the gear box and furnishes the motive power for driving the axle through a train of gears not shown. The opening 47 (FIG. 6) in the gear box is provided for a drive shaft of motor 52. When electrically energized through trolley 30 by the controls in the operator's compartment, the motor 52 rotatably drives the axle 48 in one direction or the other at a selected speed.

The improved rocking hinge type shock absorbing suspension which is the subject of the present invention will now be described.

Figure 2:
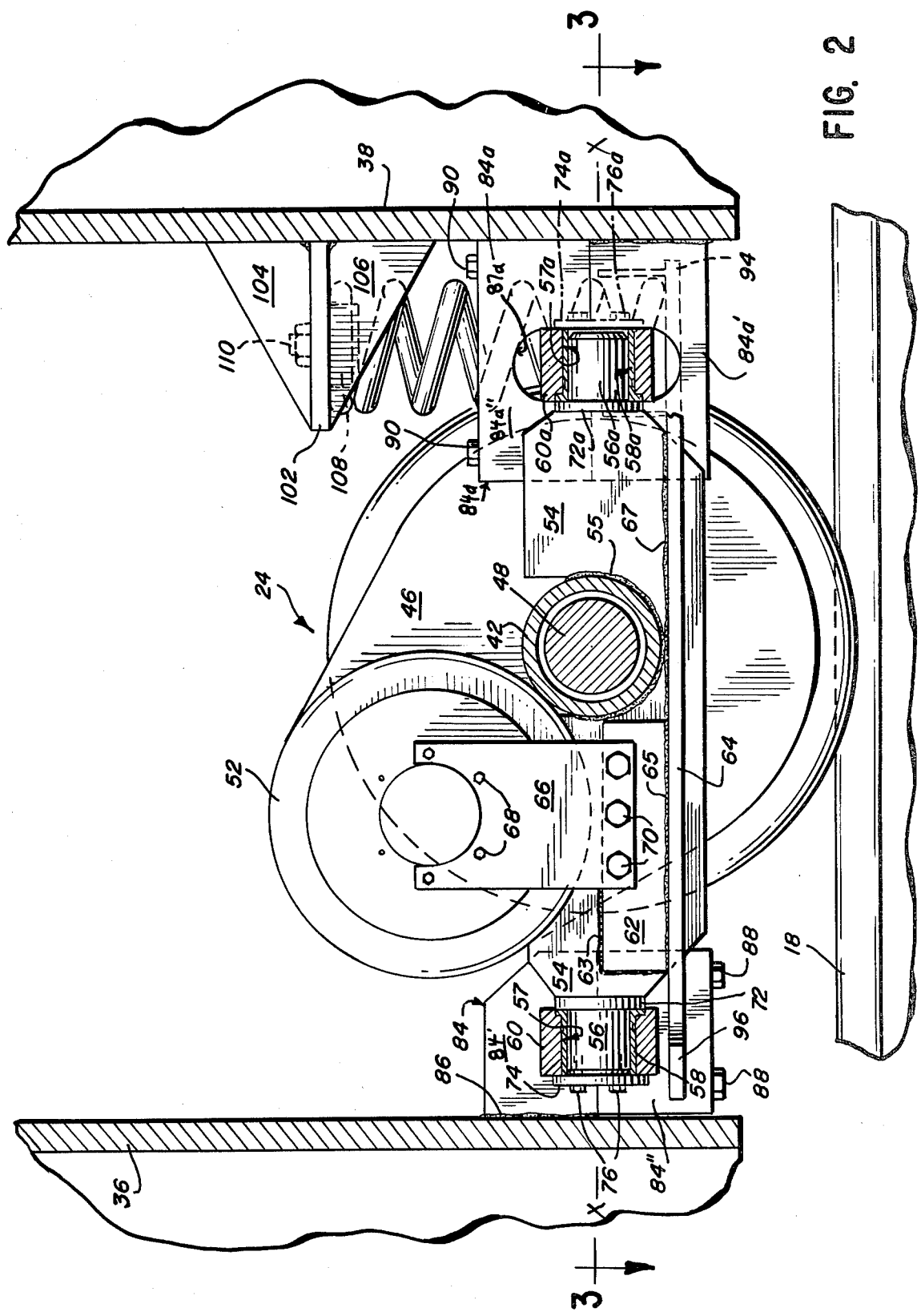
FIG. 2 is an enlarged fragmentary vertical cross-sectional view of FIG. 1 taken along line 2—2.

A trunnion bar 54 extends longitudinally of the frame midway between side wall plates 34. It is welded to the axle housing 42 along line 55. The fore and aft ends of the trunnion bar are formed with cylindrical trunnion pins 56 and 56a with annular collars 72 and 72a at their bases. These are aligned along a longitudinal axis X—X. These trunnion pins are pivotally journaled within sleeve bearings 58, 58a in throughbores 57, 57a in swivel blocks 60, 60a. Referring to FIG. 2, a spacer block 62 is welded at 63 to the side of the trunnion bar 54 and at 65 to one of two horizontal plates 64 which in turn are welded at 67 to the sides of the trunnion bar. A support plate 66 is fastened by bolts 68 and 70 to the motor 52 and block 62 respectively, providing support for the outboard end of the motor.

Thus, the axle assembly 24 is supported by pin and socket trunnion means at opposite fore and aft ends of the trunnion bar 54 for rocking movement about the longitudinal axis X—X which is generally parallel to the direction of longitudinal movement of the locomotive.

The axle assembly is hinged or pivoted to the axle assembly compartment end wall 36 for up and down tilting movement. As shown in the drawings, the left hand end of the axle assembly is hinged and the right hand end is tiltable. Details will now be described.

Figure 3:
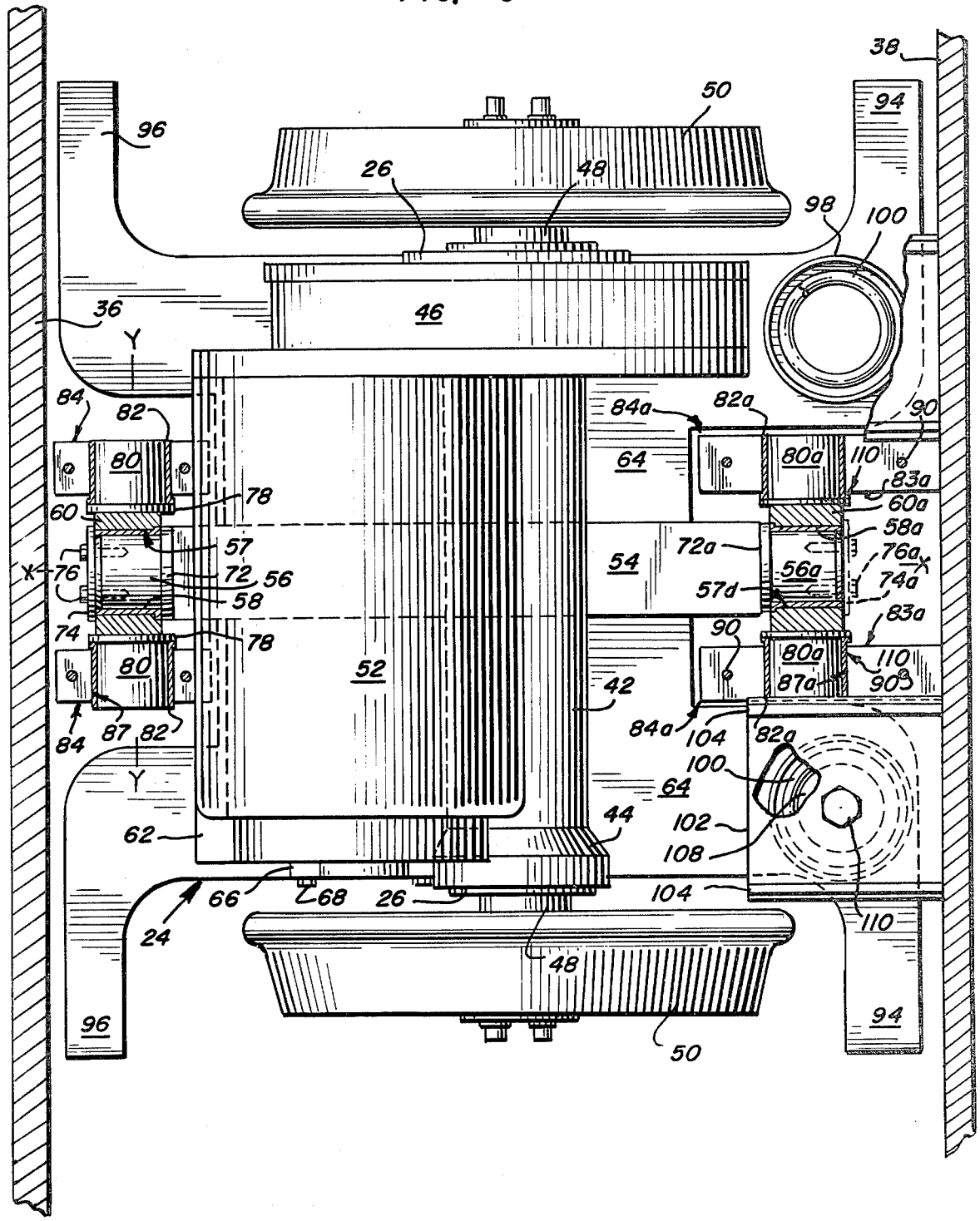
FIG. 3 is a horizontal sectional view of FIG. 2 taken on axis X—X along line 3—3.

The trunnion bar 54 has a retainer plate 74 held by bolts 76 at the hinged end. End play of the trunnion bar relative to the swivel block 60 is permitted, to a limited extent, by the collar 72 and retainer plate 74 which are engageable with opposite faces of the swivel block as shown in FIGS. 2 and 3. Swivel block 60 has collars 78, and transverse trunnion hinge pins 80, at opposite sides, aligned along hinge axis Y—Y. The trunnion hinge pins 80 are pivotally journaled in sleeve bearings 82. These, in turn, are held in split mounting blocks each generally designated 84. Each of the latter is in two halves, an upper half 84' attached as by welding at 86 (FIG. 2) to the axle compartment end wall 36, and a lower half 84" attached to the upper half by bolts 88. A preferred method of fabricating the mounting blocks is to make each from a single piece, machine the bore 87 for the bearings 82, drill and tap for the bolts 88, and then saw it in half. This assures precision fit of the two halves. The transverse trunnion hinge pins 80 enable the axle assembly to tilt up and down about hinge axis Y—Y, as previously described.

At the tiltable end of the trunnion bar 54 (to the right in the drawings), swivel block 60a and its associated parts are similar or identical to swivel block 60 and its associated parts. To facilitate this description, parts at the tiltable end which are identical or similar to those at the hinged end, are identified by the same reference numeral followed by "a". For example, trunnion pin 56 and sleeve bearing 58 have counterparts 56a and 58a.

Among the important features of the invention is the precise, friction-free, rolling connection between the tiltable end of the trunnion bar and the vehicle frame. The ruggedness and precision resulting from this connection now to be described makes the suspension especially advantageous for heavy-duty mine haulage locomotives.

Figure 4:
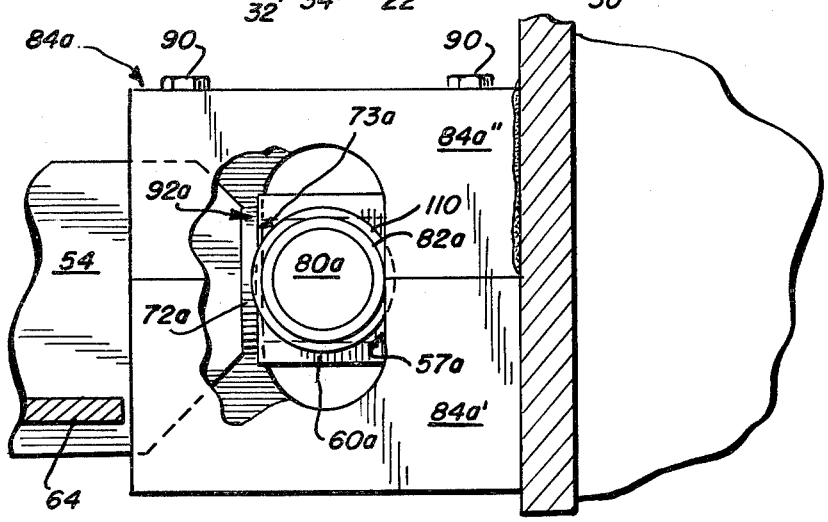
FIG. 4 is a fragmentary cross-sectional view of FIG. 3 taken along line 4—4 showing one operative position of the axle assembly.
Figure 5:
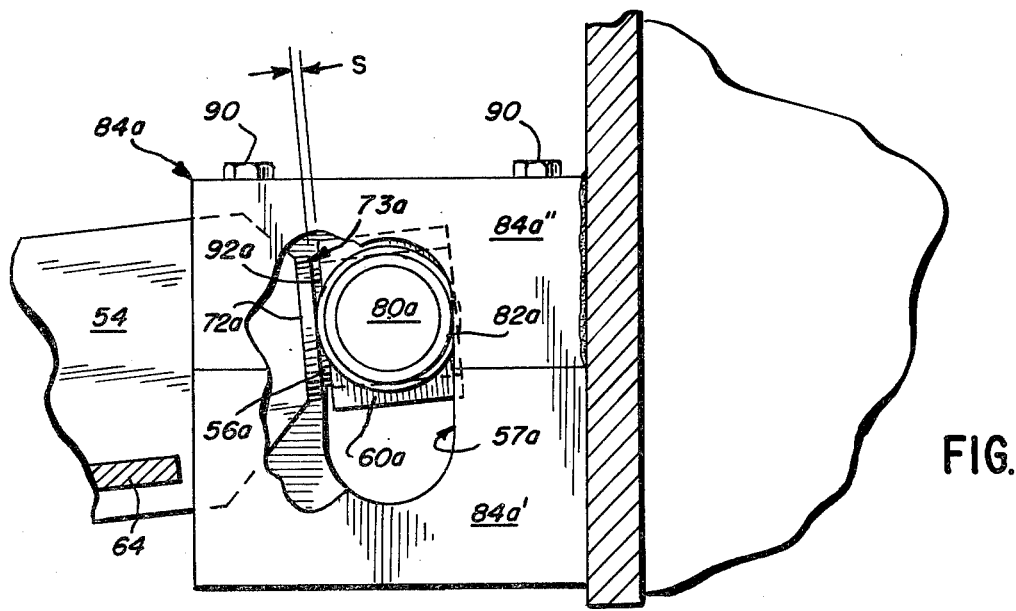
FIG. 5 is a view similar to FIG. 4 showing another operative position of the axle assembly.
Figure 6:
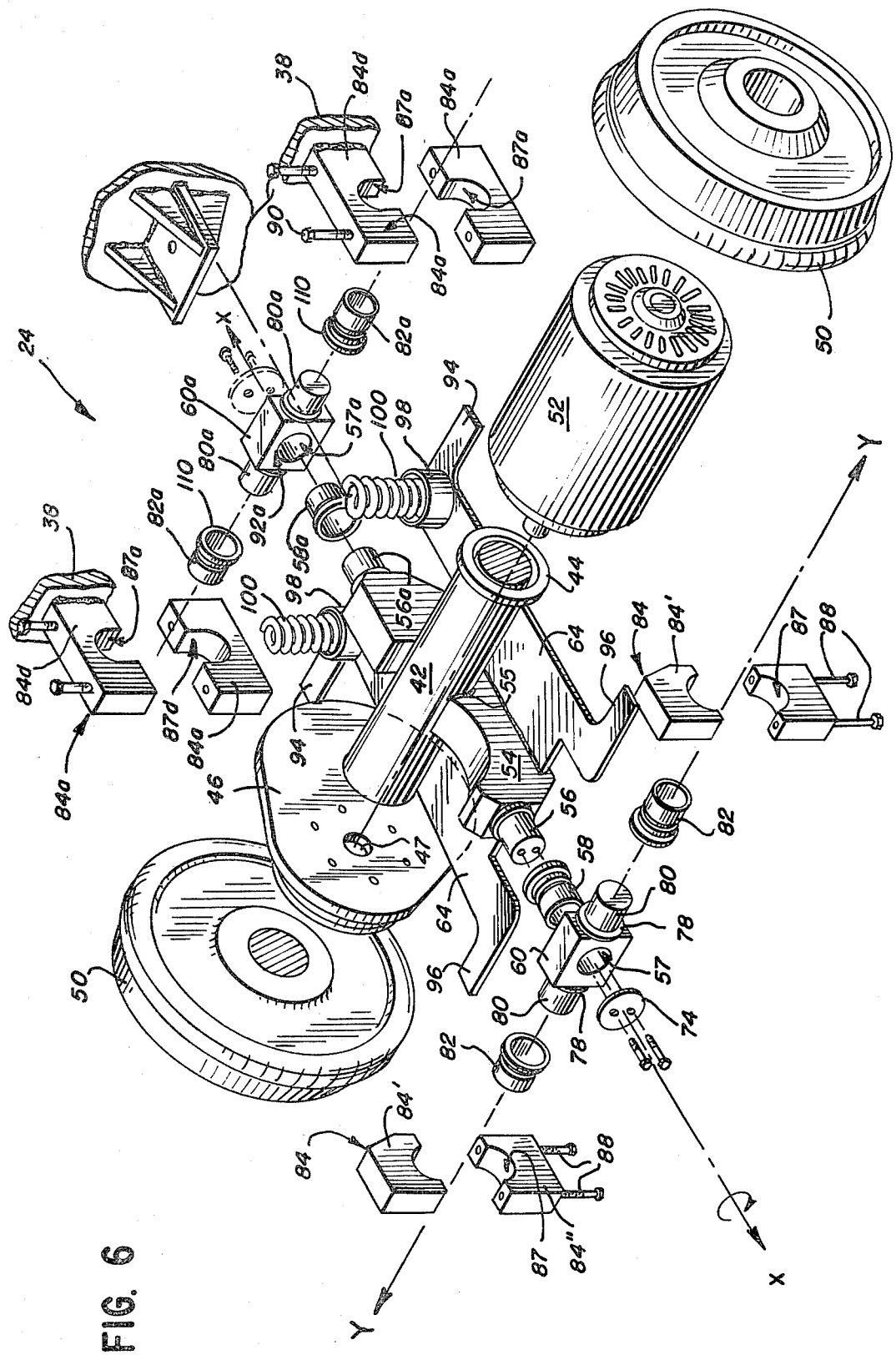
FIG. 6 is an exploded perspective view of a portion of the mechanism shown in the previous figures.

As best shown in FIGS. 3 and 6, sleeve bearings 82 for the transverse trunnion hinge pins 80 are held in circular bores 87 in the split mounting blocks 84. The corresponding construction at the tiltable end of the trunnion bar comprises rollers 82a (which here are identical to sleeve bearings 82) movable up and down in openings 87a in mounting blocks 84a. Each of the latter is in two halves, an upper half 84a" is attached as by welding to the axle compartment end wall 38, and a lower half 84a' attached to the upper half by bolts 90. The opening 87a in each mounting block 84a is a vertically elongated slot, substantially half of which is in each of the mounting block halves 84a' and 84a". Elements 82a, as stated, are here illustrated as identical to sleeve bearings 82, for the sake of minimizing the numbers of different parts to be manufactured. However, they function as rollers, being journaled for rotation about the trunnion pins 80a on swivel block 60a. Lubricating fittings and passageways (not shown) will preferably be provided to maintain the rollers 82a in freely rotatable condition. They fit snugly within slots 87a and roll up and down in friction-free engagement with the walls thereof. In the present invention, the slots 87a are shown as straight and vertical. Thus, while the swivel block is guided for straight up and down movement by slots 87a, the trunnion bar 54 tilts in an arc about transverse hinge axis Y—Y. To compensate for these different kinds of movement, trunnion 56 may be telescopically movable within bearing 58 as permitted by the spacing between collar 72 and retainer plate 74; alternatively, swivel block 60a may be telescopically movable fore and aft on trunnion pin 56a, this being illustrated in FIGS. 4 and 5. Note that in FIG. 4, where the swivel block 60a is in a mid position, halfway between the upper and lower limits of the slots 87a, the swivel block surface 92a is in substantial engagement with the end surface 73a of collar 72a, with no appreciable space between them. By contrast, in FIG. 5, where the trunnion bar has lifted the swivel block 60a, there is a substantial spacing "s" between those surfaces.

Alternatively the slots 87a may be curved, about a center line along hinge axis Y—Y, to minimize the necessity for the entire axle assembly to telescope fore and aft within sleeve bearing 58, or the swivel block 60a to telescope fore and aft on the trunnion pin 56a. Also, optionally, if desired, an additional retainer plate 74a may be fastened to the tilting end of the trunnion bar by bolts 76a, as shown in broken lines in FIG. 3.

As described above, horizontal base plates 64 are mounted on opposite sides of the trunnion bar. These have a special shape, with transverse extensions 94, 96 for supporting additional components such as brakes (not shown). Each plate 64 has an upstanding, tubular, spring-mounting seat 98 fastened as by welding on the top side at the tiltable end. As shown in the plan view of FIG. 3, these plates are cut away adjacent the trunnion bar to provide clearance for mounting blocks 84 and 84a. A heavy-duty suspension spring 100 is positioned within each tubular seat 98. The tops of the springs bear against the undersides of support plates 102 which are welded to the compartment end wall 38 and reinforced by upper and lower gussets 104, 106. Spring retainer plugs 108, held by bolts 110, fit inside the upper ends of the springs to keep them in place.

By the structure above described, the load of the vehicle frame will be applied to each axle assembly 24 as follows. First, the load will be applied to the swivel block 60 through hinge pins 80 and then to the trunnion bar 54 through trunnion 56. It will be appreciated that up and down movement of the swivel block 60 is limited to hinging movement about the axis Y—Y. Second, the load will be applied to the swivel block 60a through springs 100 and plates 64, the springs permitting cushioned up and down movement of the tilting end of the trunnion bar. As best shown in FIGS. 3 and 6, the springs 100 are substantially offset transversely from the central, longitudinal axis X—X. Thus, the springs serve the dual purpose of cushioning the axle assembly against rocking movement about the longitudinal axis X—X, and against tilting movement about the hinge axis Y—Y. During either movement, or a combination thereof, the rollers 82a roll up and down against the walls of the slots 87a while the roller flanges 110 (FIGS. 3 and 4) engage the inner surfaces 83a of the mounting blocks 84a to prevent sidewise displacement of the tilting end of the trunnion bar. Operation is quiet and smooth.

In operation, as the locomotive vehicle moves along tracks 18, the axle assembly 24 will rock sidewise about the longitudinal axis X—X, between the trunnions 56 and 56a respectively. This cushions the frame against shock and twisting caused by the kind of undulations in which the track levels change individually, for example where there is a rise or drop in one track but not the other. Such rocking of the axle assembly about axis X—X absorbs shocks where the track surface levels undulate but their average remains the same. As a practical matter, this seldom is the case, because level changes affect both tracks differently, so a raise in one seldom if ever precisely cancels out an identical drop in the other. In other words, the average level changes constantly. For absorbing this kind of shock, the tilt about the transverse axis Y—Y is effective. A sudden lift, where both wheels of the axle assembly abruptly lift at the same time, causes upward movement of the swivel block 60a, at a rate determined by the strength of the springs 100, and cushions the impact transmitted to the frame and to the operator. This invention provides a much improved suspension for a heavy-duty haulage locomotive, and a substantially more comfortable ride for the operator and others who ride the locomotive.

While one preferred embodiment of the improved shock absorbing vehicle suspension has been shown and described, it will be apparent to those skilled in the art that other specific constructions and arrangements are possible within the scope and spirit of the invention as covered by the following claims.

The embodiments of the invention in which an exclusive property or privilege is claimed are defined as follows:

1. In a vehicle, a frame, a universal wheelset mounting, an axle assembly including an axle housing with a wheel-supporting axle rotatably journaled therein, and wheels on the axle, improved ride suspension means comprising:

a pair of swivel blocks connected by trunnion means to fore and aft ends of the axle assembly, the trunnion means enabling rocking movement of the axle assembly about a longitudinal axis extending generally longitudinally of the direction of movement of the vehicle;

one of the fore and aft ends of the axle assembly being a hinged end and the other being a tiltable end;

one of the swivel blocks, at the hinged end of the axle assembly, being journaled on the frame for pivotal movement about a fixed horizontal axis transverse to the longitudinal axis enabling the axle assembly to tilt up and down about the fixed horizontal axis while concurrently rocking about the longitudinal axis;

the other of the swivel blocks, at the tiltable end of the axle assembly, being movable up and down with the axle assembly between parallel mounting blocks fastened to the frame adjacent opposite sides of said other swivel block;

guide track means comprising a pair of generally vertical slots formed respectively in said mounting blocks, each slot being characterized by opposed upright marginal guide walls spaced apart in a direction parallel to said longitudinal axis;

a pair of aligned rollers extending transversely from opposite sides of said other swivel block into said slots for rolling engagement with said marginal guide walls to limit fore and aft movement of the axle assembly while enabling up and down tilting movement about said horizontal axis, and enabling rocking movement about the longitudinal axis; and spring means acting between the frame and the tiltable end of the axle assembly on each side of the longitudinal axis urging the axle assembly downwardly;

whereby the spring means and said one swivel block at the hinged end of the axle assembly provide a stable, cushioned, three-point support between the frame and the axle assembly;

and whereby further, shocks applied to the axle assembly through the wheels are absorbed by rocking of the axle assembly about the longitudinal axis and by up and down tilting movement of the axle assembly about the fixed horizontal axis, throughout a range permitted by deflection of the spring means.

* * * * *